(12) United States Patent
Yuan et al.

(10) Patent No.: US 9,933,824 B2
(45) Date of Patent: Apr. 3, 2018

(54) CENTRIFUGAL FAN AND AN ELECTRONIC DEVICE HAVING THE SAME

(71) Applicant: Lenovo (Beijing) Co., Ltd., Beijing (CN)

(72) Inventors: Chunfeng Yuan, Beijing (CN); Jinyu Li, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 294 days.

(21) Appl. No.: 14/788,050

(22) Filed: Jun. 30, 2015

(65) Prior Publication Data

US 2016/0209893 A1    Jul. 21, 2016

(30) Foreign Application Priority Data

Jan. 21, 2015   (CN) .......................... 2015 1 0031060

(51) Int. Cl.
| | |
|---|---|
| *G06F 1/20* | (2006.01) |
| *F04D 29/42* | (2006.01) |
| *F04D 25/06* | (2006.01) |

(52) U.S. Cl.
CPC ........... *G06F 1/203* (2013.01); *F04D 29/422* (2013.01); *F04D 29/4226* (2013.01)

(58) Field of Classification Search
CPC ..... G06F 1/203; F04D 29/422; F04D 29/4226
See application file for complete search history.

(56) References Cited

U.S. PATENT DOCUMENTS

| | | | | |
|---|---|---|---|---|
| 3,286,914 A | * | 11/1966 | Baverstock | ........... F04D 29/668 |
| | | | | 415/119 |
| 8,083,477 B2 | * | 12/2011 | Hwang | ............... F04D 25/0613 |
| | | | | 415/119 |
| 8,105,026 B2 | * | 1/2012 | Eguchi | .................. F04D 29/422 |
| | | | | 415/204 |
| 8,251,642 B2 | * | 8/2012 | Hwang | ................... F04D 17/16 |
| | | | | 415/102 |
| 2006/0099071 A1 | * | 5/2006 | Kao | ...................... F04D 29/667 |
| | | | | 415/206 |

FOREIGN PATENT DOCUMENTS

| | | |
|---|---|---|
| CN | 201277204 Y | 7/2009 |
| CN | 102042264 A | 5/2011 |
| CN | 201843837 U | 5/2011 |
| CN | 203594628 U | 5/2014 |
| GB | 191214668 A  * | 6/1912 |

OTHER PUBLICATIONS

Office Action, and English language translation thereof, in corresponding Chinese Application No. 201510031060.4, dated Nov. 3, 2017, 10 pages.

* cited by examiner

*Primary Examiner* — Woody Lee, Jr.
*Assistant Examiner* — Brian O Peters
(74) *Attorney, Agent, or Firm* — Brinks Gilson & Lione; G. Peter Nichols

(57) ABSTRACT

A centrifugal fan for an electronic device is described. The centrifugal fan includes a volute casing with an outlet; and vanes accommodated in the volute casing. The volute casing has an inner surface facing the vanes, the inner surface being formed with a plurality of air guiding channels for directing air inside the volute casing in a direction towards the outlet of the volute casing.

9 Claims, 5 Drawing Sheets

CENTRIFUGAL FAN AND AN ELECTRONIC DEVICE HAVING THE SAME

This application claims priority to Chinese Patent Application No. 201510031060.4 filed on Jan. 21, 2015; the entire contents of which are incorporated herein by reference.

BACKGROUND

The present disclosure relates to a centrifugal fan and an electronic device having the same.

A centrifugal fan is widely used as a cooling device in an electronic device. For example, most laptops use a centrifugal fan to dissipate the heat generated therein. An electronic device equipped with a centrifugal fan is required to be as calm as possible in order to make the user have a comfortable experience.

In order to reduce the noise of the centrifugal fan, conventionally, the designers focus on making improvements to the vanes, such as, changing the radial and axial dimensions of the vanes, changing the number of the vanes, changing the profile of the vanes, etc. However, these improvements to the vanes are limited by the narrow space in the volute casing of the centrifugal fan. What's more, the requirements on the wind speed, pressure and volume produced by the centrifugal fan also limit the design freedom of the shape, structure and number of the vanes. Therefore, after many years of improving to the vanes, it becomes hard to further reduce the noise through making improvement to the vanes.

Recently, some designers try to reduce the noise through optimize the distance/gap between the vanes and the volute casing, especially the gap around the volute tongue of the volute casing. Specially, the designers recognize that if the gap between the vanes and the volute tongue is too narrow, the centrifugal fan tends to "scream" and the noise level will be increased. Thus, designers begin to enlarge the gap between the vanes and the volute tongue. However, this brings another problem, i.e. the wind speed, pressure and volume are also reduced since some air cannot be effectively impelled or guided out of the exit of the fan but tends to circulate in the volute casing.

Therefore, there is a need for providing an improved centrifugal fan which on one hand may reduce the noise compared with the centrifugal fan in the prior art and on the other hand can produce at least same or even higher wind speed, pressure and/or volume. Accordingly, there is also a need for providing an electronic device with such a centrifugal fan.

SUMMARY

In an embodiment of the present disclosure, it is provided a centrifugal fan for an electronic device, the centrifugal fan comprising a volute casing with an outlet; and vanes accommodated in the volute casing, wherein the volute casing has an inner surface facing the vanes, the inner surface being formed with a plurality of air guiding channels for directing air inside the volute casing in a direction towards the outlet of the volute casing.

In another embodiment of the present disclosure, it is provided an electronic device having a centrifugal fan according to the above embodiment.

It should be appreciated that above description is merely for illustrative purposes and are not intended to limit the scope of the disclosure.

DETAILED DESCRIPTION

Figure 1:
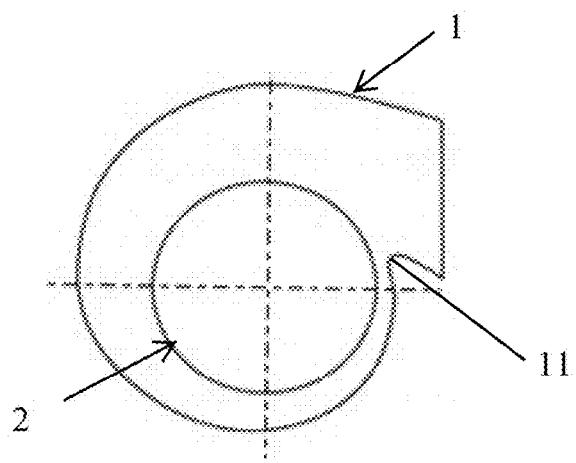
FIG. 1 is a simplified drawing of a centrifugal fan according to an embodiment of the present disclosure.

Foregoing and other technical solutions, features and advantages of the present disclosure will become apparent from the detailed description hereinafter in conjunction with accompanying drawings. The terms, such as "on", "under", "left", "right", "front", "back", or the like, if used in embodiments hereinafter, are used to indicate directions of drawings. Therefore, direction terms are for illustration purposes and are not intended to limit the present disclosure. Also, same reference numbers indicate same elements.

Various exemplary embodiments of the present disclosure will be described hereinafter referring to the drawings.

Firstly, referring to FIG. 1 which is a simplified drawing of a centrifugal fan according to an embodiment of the present disclosure, the centrifugal fan comprises a volute casing 1 and vanes 2 (also called "impeller") accommodated in the volute casing 1, and the volute casing 1 has a volute tongue 11 arranged adjacent to an outlet of the volute casing 1. In FIG. 1, the appearance of the centrifugal fan of the present disclosure is similar with that of a centrifugal fan in the prior art. The difference (not shown in FIG. 1) mainly lies in the design of the volute tongue, which will be discussed later.

Figure 2:
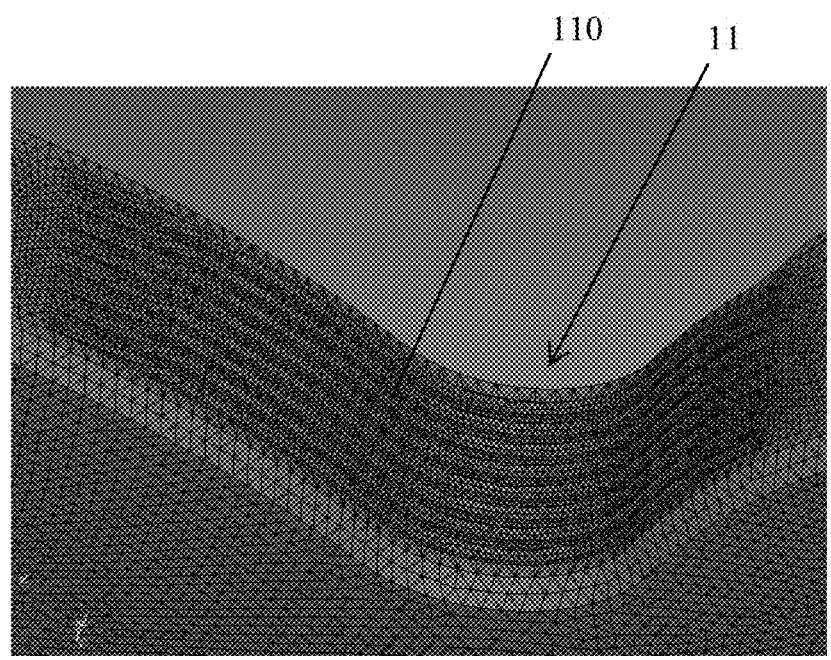
FIG. 2 is a schematic partial 3D view showing the outer surface of the volute tongue of the volute casing of the centrifugal fan of FIG. 1.

Referring to FIG. 2 which is a schematic partial 3D view showing the outer surface of the volute tongue of the volute casing of the centrifugal fan of FIG. 1, the structure of the volute tongue of the volute casing will be discussed in detail. It should be noted that for clarity and convenience, FIG. 2 shows the outer surface of the volute tongue, but it can be understood that its inner surface facing the vanes may has a shape complementary with that of the outer surface. In other words, a protrusion on the outer surface corresponds to a depression on the inner surface, vice versa. It can be seen from FIG. 2, the inner surface of the outlet of the volute casing of the centrifugal fan, particularly, the inner surface of the volute tongue 11 at or adjacent to the outlet of the volute casing of the centrifugal fan, is formed with a plurality of air guiding channels 110 substantially parallel to each other, for directing air inside the volute casing in a direction towards the outlet of the volute casing. (note: in FIG. 2, 110 points to a protrusion on the outer surface which corresponds to a channel/depression on the inner surface of the tongue). The extending direction of the channel 110 is along the air exhausting direction of the fan. With the help of the channels 110 at the volute tongue, the air around the volute tongue 11 is guided to flow in a substantially same direction, therefore, the turbulence current around the volute tongue 11 is avoided, which will reduce the air noise while not reduce the wind speed blowing out from the exit of the fan.

In the embodiment of FIG. 2, only the shape and structure of the inner surface of the volute tongue 11 is modified to reduce noise, but other parameters, like the gap between the volute tongue 11 and the vanes 2, are not changed, therefore, a centrifugal fan in the prior art can be modified/manufactured as that of the present disclosure by minimally modifying the original mold, therefore, the modification cost is relatively low. What's more, since the overall size of the fan is not changed, the improved fan of the present disclosure can still be used in the original electronic device as before. That is, the centrifugal fan of an electronic device in the prior art can be directly replaced with the improved centrifugal fan of the present disclosure without any further modification to the electronic device.

Further referring to FIG. 2, it can be seen that the air guiding channels 110 are extended with its depth gradually increased (from the left in the figure) to a predefined value, then maintained at the predefined value for a distance (at the middle segment in the figure), and then gradually decreased (toward the right in the figure) from the predefined value. Thus, the depth of the air guiding channels 110 are changed gradually, which will have good guidance to the air flow and will not result in sharp change of flow speed and/or direction. Accordingly, a centrifugal fan of low noise will be realized. In an embodiment, the channels 110 may have same widths.

For the forming of the air guiding channels 110, particularly, they can be formed as an integral part of volute casing during the casting or molding of the volute casing, in this case, they are formed by the volute casing itself.

The centrifugal fan of the present disclosure can be used for the heat dissipation for an electronic device, especially for a portable device like a laptop.

Now, refer to FIGS. 3 and 4 to describe the wind speed and wind pressure produced by the centrifugal fan according to an embodiment of the present disclosure, wherein FIG. 3 is a wind speed profile comparison chart, wherein the left chart (A) shows the wind speed profile of a centrifugal fan in the prior art and the right chart (B) shows the wind speed profile of a centrifugal fan according to an embodiment of the present disclosure; and FIG. 4 is a wind pressure profile comparison chart, wherein the left chart (A) shows the wind pressure profile of a centrifugal fan in the prior art and the right chart (B) shows the wind pressure profile of a centrifugal fan according to an embodiment of the present disclosure.

Figure 3A:
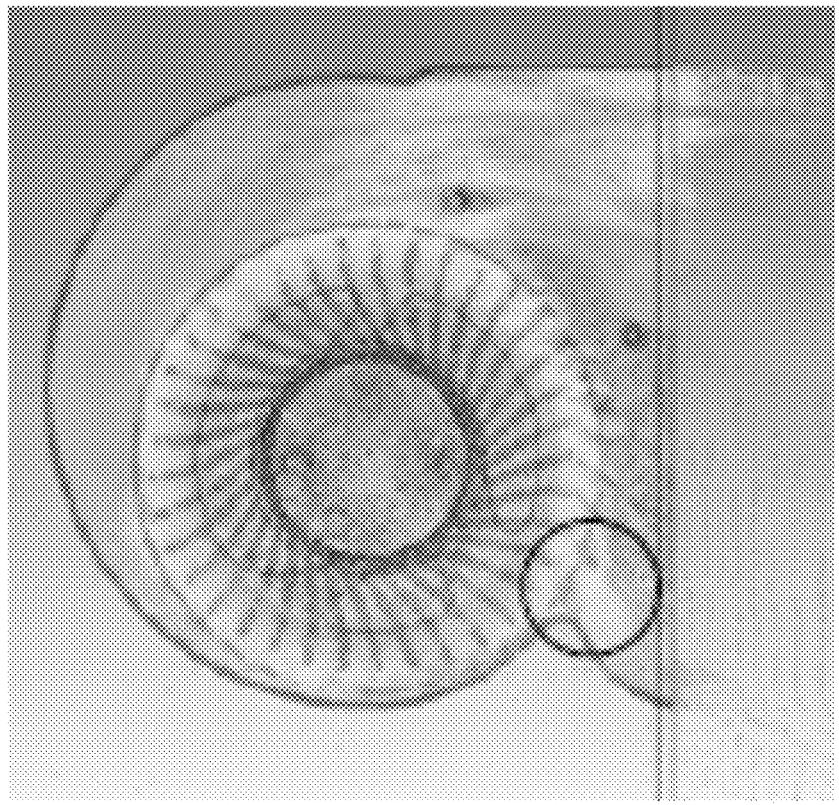
FIG. 3A is a wind speed profile of a centrifugal fan in the prior art.
Figure 3B:
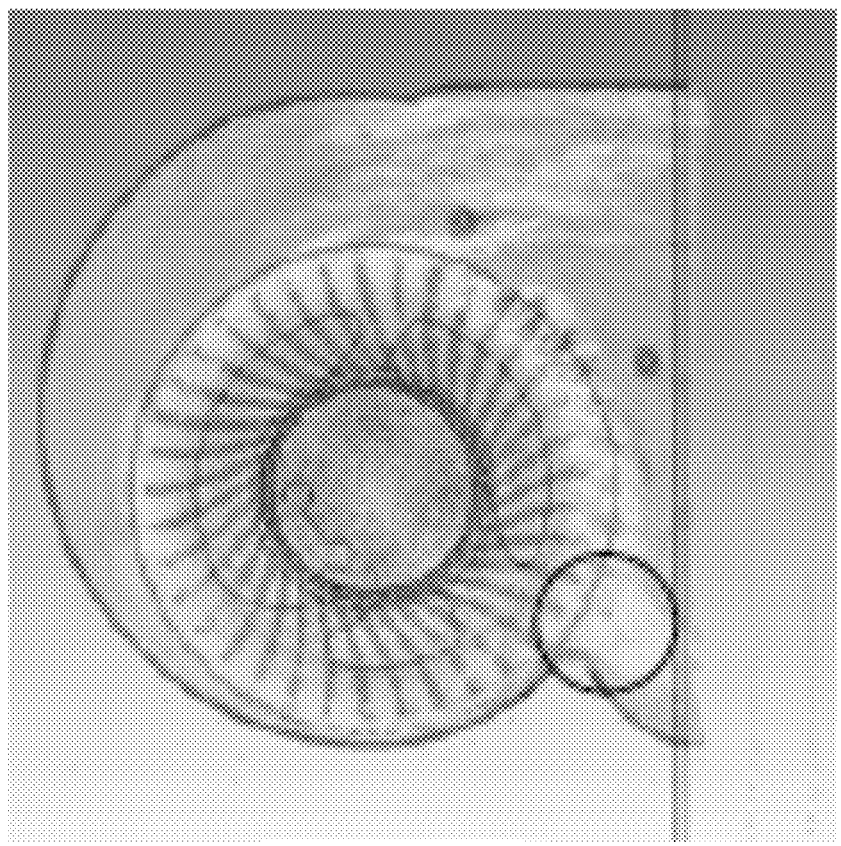
FIG. 3B is a wind speed profile of a centrifugal fan according to an embodiment of the present disclosure.

Comparing FIGS. 3(A) and 3(B), especially the part around the volute tongue encompassed by a circle, it can be seen that the centrifugal fan of the present disclosure as shown in FIG. 3(B) has more uniform wind speed distribution (i.e. the gray in the figure is more uniform). Accordingly, it can be understood the wind volume of the present disclosure will be more stable. Experiments indicates that compared with a similar centrifugal fan without channels at the volute tongue, the wind volume blown out of the fan of the present disclosure will be higher about 5%-10%, but the wind noise is substantially lower.

Figure 4A:
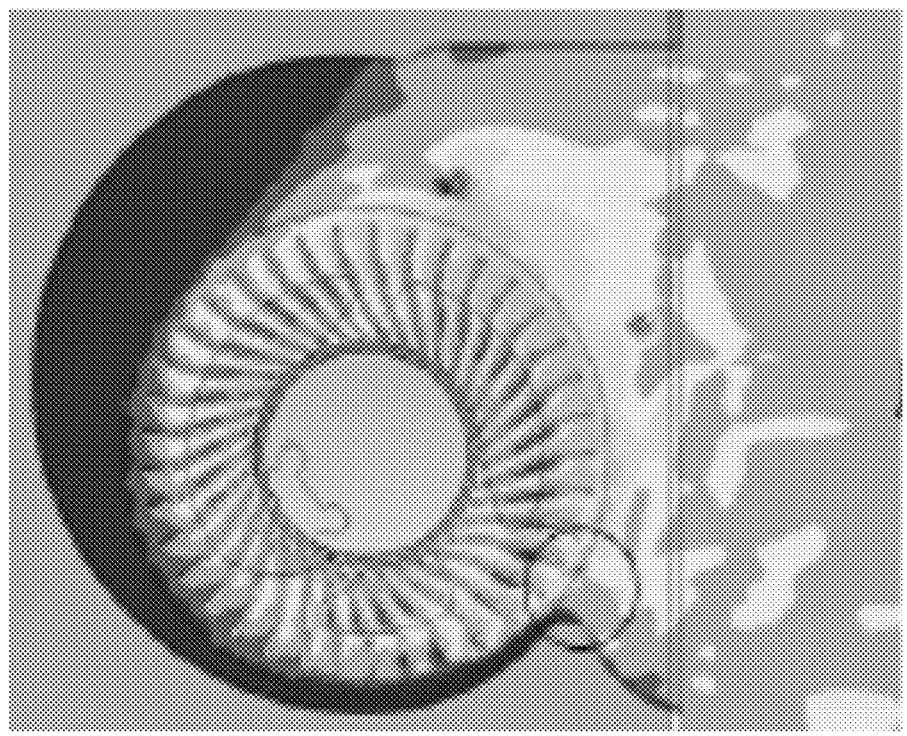
FIG. 4A is a wind pressure profile of a centrifugal fan in the prior art.
Figure 4B:
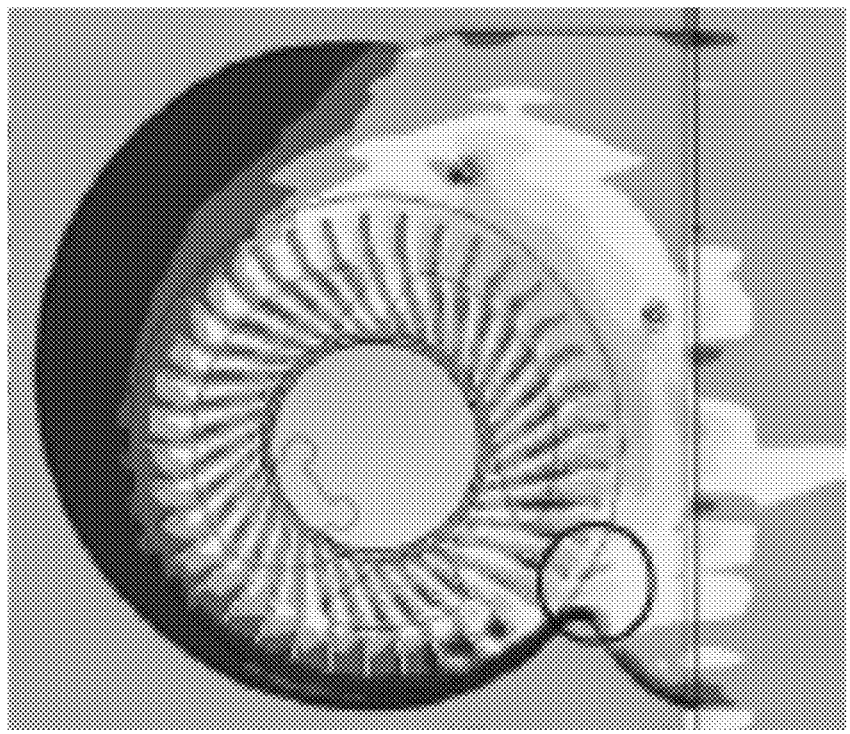
FIG. 4B is a wind pressure profile of a centrifugal fan according to an embodiment of the present disclosure.

Comparing FIGS. 4(A) and 4(B), especially the part around the volute tongue encompassed by a circle, it can be seen that the centrifugal fan of the present disclosure as shown in FIG. 4(B) has more uniform wind pressure distribution (i.e. the gray in the figure is more uniform). Accordingly, the wind noise produced by the fan of the present disclosure will be lower.

It should be noted that, although in the various embodiments, the present disclosure has been described in the specification and are illustrated in the accompanying drawings, those skilled in the art will appreciate that the above-described embodiments are merely exemplary embodiments, and within the scope of the present disclosure, some further modification is possible, for example, the air guiding channels at the volute tongue may have different widths and depth, and the depth transition along the channel may not necessary as same with the present disclosure. Moreover, some embodiments of the claimed centrifugal fan may include a volute casing with a volute tongue, whereas other embodiments may include a volute casing without any volute tongue. However, the embodiment of the present disclosure as discussed above will have better technical effect.

Further, it should be noted that some technical features in the embodiments may be not necessary for solving a specific technical problem, which can be removed or omitted without affecting the resolution to the technical problems; also, features, elements and/or functions of one embodiment can be combined, composited, cooperated with features, elements and/or functions of one or more other embodiments, unless the combination, composition or cooperation cannot be implemented.

The invention claimed is:

1. A centrifugal fan for an electronic device, the centrifugal fan comprising:
   a volute casing with an outlet;
   vanes accommodated in the volute casing,
   wherein the volute casing has an inner surface facing the vanes and being formed with a plurality of air guiding channels for directing air inside the volute casing in a direction towards the outlet of the volute casing, and wherein the volute casing has an outer surface with a shape complementary with the inner surface so that the channels on the inner surface are corresponding protrusions on the outer surface;
   wherein the volute casing comprises a volute tongue arranged adjacent to the outlet of the volute casing and the air guiding channels are arranged substantially parallel to each other at the volute tongue; and
   wherein the air guiding channels are extended from a depth that is gradually increased to a predefined value, maintained at the predefined value for a distance, and then gradually decreased from the predefined value.

2. The centrifugal fan according to claim 1, wherein the plurality of air guiding channels have substantially the same width.

3. The centrifugal fan according to claim 1, wherein the air guiding channels are integral parts of the volute casing.

4. The centrifugal fan according to claim 3, wherein the air guiding channels are formed as integral parts of the volute casing during casting or molding of the volute casing.

5. The centrifugal fan according to claim 1, wherein the electronic device is a laptop.

6. An electronic device comprising a centrifugal fan according to claim 1.

7. The electronic device according to claim 6, wherein the electronic device is a laptop.

8. The centrifugal fan according to claim 1 wherein a gap between the volute tongue and a distal end of the vanes is constant.

9. A centrifugal fan for an electronic device, the centrifugal fan comprising:
   a volute casing with an inner surface and an outlet;
   a volute tongue arranged upstream of and adjacent to the outlet;
   vanes accommodated in the volute casing, a plurality of air guiding channels formed with the inner surface as part of volute casing and facing the vanes to direct air inside the volute casing in a direction towards the outlet of the volute casing, the air guiding channels being arranged substantially parallel to each other at the volute tongue, wherein an outer surface of the volute casing has a shape complementary to the inner surface so that the channels on the inner surface are corresponding protrusions on the outer surface; and wherein the air guiding channels are extended from a depth that is gradually increased to a predefined value, maintained at the predefined value for a distance, and then gradually decreased from the predefined value.

\* \* \* \* \*